May 12, 1970            G. SCHIFF            3,511,177
PRESSES
Filed Aug. 7, 1967                            3 Sheets-Sheet 1
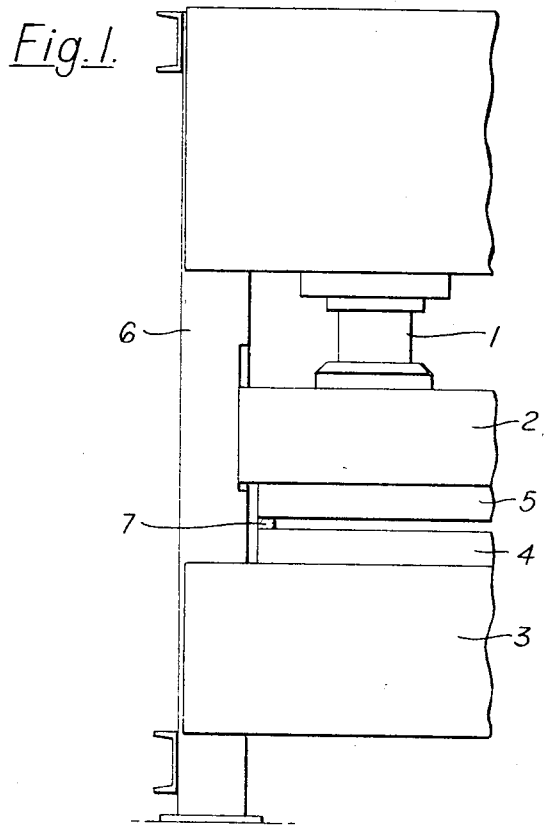
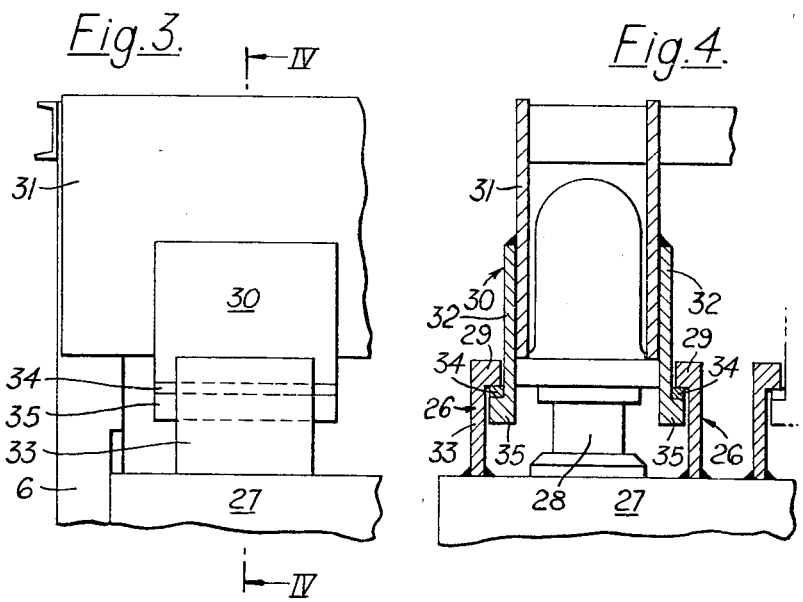
Inventor
GEORGE SCHIFF
By Kurt Kelman
AGENT

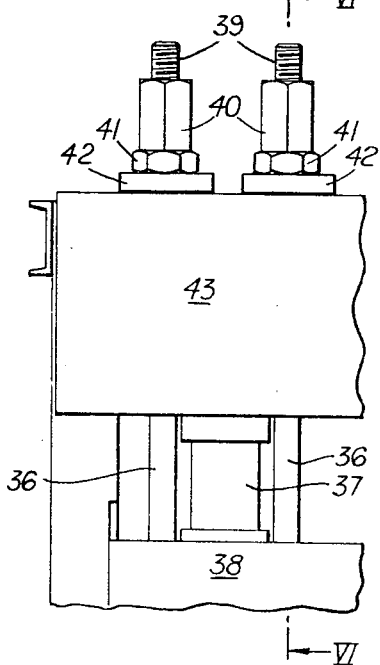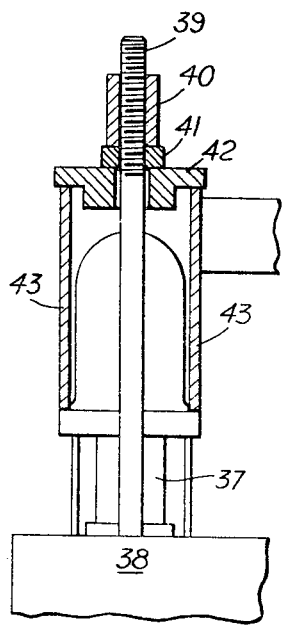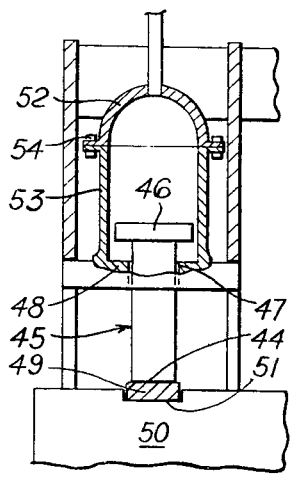

United States Patent Office 3,511,177
Patented May 12, 1970

3,511,177
PRESSES
George Schiff, Elstree, England, assignor of one-half to The Ulster Chipboard Company Limited, Castleroe, Coleraine, Northern Ireland, a British corporation
Filed Aug. 7, 1967, Ser. No. 658,921
Claims priority, application Great Britain, Aug. 8, 1966, 35,438/66
Int. Cl. B30b 15/06
U.S. Cl. 100—257                                   7 Claims

ABSTRACT OF THE DISCLOSURE

A press incorporating means located externally of the pressing space between the head and table for enabling the distance between the platens of the press to be selected when the pressing stop takes place, such means being provided by the interengagement of a stop associated with the head and an abutment associated with a structure element of the press, and means being provided for adjusting the position at which the stop and abutment interengage.

Background of invention

This invention concerns improvements in or relating to presses, more particularly hydraulic presses, that is presses consisting essentially of a ram or piston working in a cylinder to which pressurized hydraulic fluid is admitted, the said ram or piston carrying a head between which and a table the material to be pressed is located.

When using a press to manufacture, for example, boards or panels, it is most desirable that the distance between the said head and the table should be exactly regulatable in order to enable a finished product to be produced with a minimum deviation from the required thickness. This requirement for accuracy is important also from an economic point of view, in connection with the production of boards, panels and the like because it is usually required that the thickness of the board or panels should be relatively small compared with its other two dimensions forming the overall area so that any inaccuracy in the thickness of the board or panel produced can give rise to a considerable volume of wasted material (which would have in most cases to be removed by a finishing process) and thereby considerable cost.

Previously, in order to control the distance between the said head and table of a hydraulic press, it has been customary to use metal spacer strips or distance pieces of such constitution as to stand up so far as possible to the high temperatures and pressures normally used in presses, such spacer strips being ground accurately to the thickness required and being inserted between the head and the table along opposite parallel edge portions of the press platens so that, as the head approaches the table, the thickness of the aforesaid spacer strips determines the final distance between the head and the table, that is the material is compressed as near as possible to the final and desired thickness.

A disadvantage of this well known process is that, as will be appreciated, the pressure exerted on the head by the ram or piston is, when the spacer strips are reached, concentrated on those edge portions of the head and table contacting the spaced strips and this gives rise to a tendency of the metal spaced strips to bite into or deform the surface of the head and/or table, thereby making it no longer possible accurately to space the latter from each other by using a spacer strip of known thickness. Such damage to the head and/or table necessitates levelling or planing the latter but here again difficulty is encountered because there are often channels located in the head and table adjacent the facing surfaces thereof for the introduction of heating fluid, for example, water, steam and/or oil used for heating the material to be pressed and any levelling or planing of the head and/or table could eventually lead to damage to such channels; also since the thickness is less, after such planing, the press plates become weakened.

Moreover, since the force applied is concentrated along only the edge portions of the head or table, there is a tendency for the central portion of the head to bend giving rise to inaccuracy in the finished product.

A further disadvantage is that the material being pressed often incorporates a fibrous material, for example, wood particles, and there is a tendency for fibres near the edges of, for example, a panel being formed making their way between the aforesaid spacer strips and the adjacent surfaces of the head and/or table, which because it is not practicable to keep cleaning the surfaces owing to, for example, the delays incurred, give rise to damage to the surfaces of the steel strips and the surfaces of the head and table (for example, by causing the metal thereof to flow) making it impossible in due course to control accurately the distance between the head and table during the pressing owing to the resulting deformation of the several parts.

It is an object of the present invention to provide a press incorporating means which overcome or reduce the aforesaid disadvantages of known presses and which enable the distance between the head and the table to be accurately adjusted to the desired thickness and also easily to re-adjust for another selected thickness with minimum loss of time and effort.

Summary and description of invention

According to the present invention, there is provided in or for a press comprising a head between which and a table material is adapted to be pressed, means for controlling the distance between the said head and table, said means being located externally of the pressing space between the said head and table and comprising a stop associated with the head so as to be adapted to follow the movement thereof, an abutment adapted to co-operate with the said stop to prevent the head and table from moving towards each other, and means for adjusting the position at which the said stop and abutment cooperate with each other so as to select the final distance between the head and table when the pressing step takes place.

Conveniently the said abutment is associated with a structural element of the press, that is with an element which is stationary in relation to the head and which has sufficient strength and rigidity for the purpose in question.

The means of the invention are particularly applicable for incorporation in a hydraulic press comprising a ram or piston working in a cylinder to which pressurized hydraulic fluid is adapted to be admitted and carrying the said head, and for the sake of convenience the invention will hereinafter be described in connection with hydraulic presses.

Desirably the said stops and abutment are provided in the vicinity of the or each cylinder of the press and desirably a stop and abutment will be provided on opposite sides of each cylinder. According to one feature of this invention, the or each said stop may be rigidly associated with the or each piston or ram in which case the or each abutment may be associated with the or each cylinder.

The means for adjusting the position at which the said stop and abutment contact each other may, for example, comprise spacer members selectively adapted to be inserted between the said stop and abutment, and/or the stop and/or abutment may itself be adjustable in position.

In a modification of the invention, the stop may be provided by a part of the ram or piston within the cylinder nad the abutment may be provided by a guide plate through which the ram and piston reciprocates, spacer members being provided for insertion between the head and ram or piston.

By using the press of the invention, it is possible accurately to space the head from the table, thereby determining the thickness of material pressed between the latter, the reaction being taken up in the vicinity of the or each cylinder, thereby overcoming the aforesaid disadvantages of known presses.

It is moreover possible to adapt existing presses to incorporate the means of the present invention. Whether or not, however, the invention is applied to existing presses or incorporated in new ones, the said stop and abutment are desirably separate members subsequently rigidly secured to the head and structural element respectively rather than being made integrally with the latter. Moreover, whilst welding will usually be a satisfactory and convenient way of securing the stop and abutment to the head and structural element respectively, the stop and/or abutment may be adapted to be releasably secured to the head and structural element respectively, for example, by screw threaded means, to facilitate dismantling of the press when desired.

According to another feature of the invention, the or each said stop may comprise a bracket or the like rigidly connected to the said head and so positioned and shaped as to co-operate with an abutment comprising a second bracket or the like rigidly secured to a structural element of the press, spacer members of accurately known thickness being provided for selective insertion between the two brackets so that the distance between the head and table at the pressing position may be selected.

According to a further feature of the invention, the or each said stop may comprise a rigid rod, rigidly secured to the head of the press and provided at the end thereof remote from the said head with a stop member adjustable on said rod, the said rod being adapted to slide within a central aperture of a plate forming an abutment rigidly supported on a structural element of the press, the arrangement being such that, by adjusting the position of the said stop member on the end portion of the said rod, it is possible to select when the said stop member contacts the said apertured plate thereby determining the distance between the head and the table at the pressing position. Conveniently in such a case, the said stop member comprises a nut and the end of the rod with which it is associated is screw-threaded so that the nut can be adjusted in position on the screw-threaded end of the rod and locked in position.

Brief description of drawings

The invention also extends to boards, panels and the like when formed using a press incorporating the means of the invention.

In order that the invention may be more readily understood, several embodiments of the same will now be described by way of example and with reference to the accompanying drawings in which:

FIG. 1 is a fragmentary end view of a hydraulic press showing conventional means for controlling the distance between the head and table thereof;

FIG. 3 is a fragmentary front elevation of a hydraulic press showing a third embodiment of the invention;

FIG. 4 is a section on the line IV—IV of FIG. 3;

FIG. 5 is a fragmentary front elevation of a hydraulic press showing a fourth embodiment of the invention;

FIG. 6 is a section on the line VI—VI of FIG. 5; and

FIG. 7 is a rear view partly in section of a cylinder of a hydrualic press illustrating a fifth embodiment of the invention.

Description of shown embodiments

Figure 2:
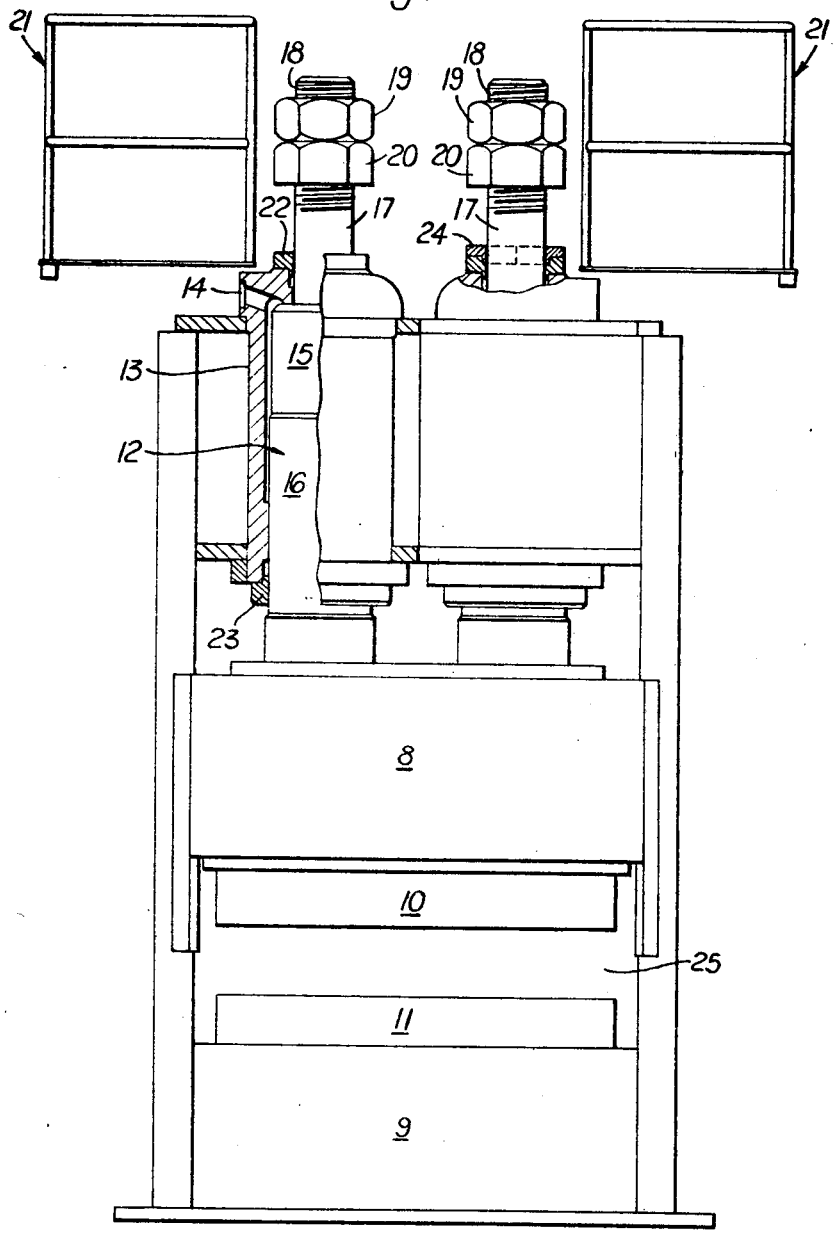
FIG. 2 is a end view partly broken away of a hydraulic press showing on the right hand and left hand respectively two embodiments of the present invention.

FIG. 1 is a fragmentary end view of a hydraulic press consisting of a number of pairs of rams or pistons 1 each working in a cylinder to which pressurised hydraulic fluid is adapted to be admitted and carrying a single head 2, the pairs of cylinders 1 being arranged at spaced locations longitudinally of the head 2 with the individual cylinders of each pair spaced transversely of the head, the press also including a stationary table 3 between the platen 4 of which and the platen 5 of the head 2 the work to be pressed is adapted to be inserted.

An upright connecting member 6 is provided between the base of the press and the cross member holding the cylinders.

The conventional means, shown in FIG. 1, for controlling the distance between the head 2 and table 3 thereof comprise a metal spacer strip 7 ground accurately to the thickness required and inserted between the platens 4 and 5 along opposite parallel edge portions of the press so that, as the head 2 approaches the table 3, the thickness of the spacer strip 7 determines the final distance between the head and the table, that is the material is compressed to the desired thickness. The disadvantages of such conventional means have been discussed hereinbefore.

All the embodiments of the present invention to be described with reference to the drawings are incorporated into hydraulic presses consisting of a number of rams or pistons each working in a cylinder to which pressurised hydraulic fluid is adapted to be admitted and carrying a single head which may also be multi-part, the cylinders being arranged at spaced locations longitudinally of the head—and in the case of pairs or multiple cylinders with the individual cylinders of each pair or multiple spaced transversely of the head—the press also including a stationary table between which and the head the work to be pressed is adapted to be inserted.

In the preferred first and second embodiments (see FIG. 2), the hydraulic press is formed to incorporate the invention as opposed to being an adapted existing press and comprises a head 8 and a table 9 between the platens 10 and 11 of which the material is to be pressed. The ram or piston 12 works in a cylinder 13 to which hydraulic fluid is adapted to be admitted through port 14. (Although the ram is shown in two parts 15 and 16 of different diameter this is not essential.)

The upper end of the ram or piston 12 is extended axially at 17 beyond the cylinder 13 and is screw-threaded at 18 to receive in screw-threaded engagement two nuts 19 and 20 providing a stop, the lower nut 20 acting as a lock-nut, and the position of nut 19 being accurately adjustable by a micrometer type arrangement to give the selected desired thickness of pressed panels in increments of .1 mm. Reference 21 indicates walkways for ready access to the nuts 19 and 20.

FIG. 2 illustrates two different embodiments of the invention applied to each cylinder. Thus in the first embodiment, shown in the left-hand cylinder arrangement a gland packing ring 22 which prevents leakage of the pressurised hydraulic fluid is provided at the top of the cylinder and provides an abutment against which the nut 20 bears at the final pressing position. A packing gland 23 is provided at the bottom of the cylinder 13 to prevent leakage therefrom of the hydraulic fluid.

As will be apparent, the position of the nuts 19 and 20 on the upper extension 17 of the ram or piston 12 may be adjusted to provide a selected distance between the platens 10 and 11 at the final pressing position and, as the head 8 moves downwardly under the action of the hydraulic fluid, downward movement is prevented when the lower face of the nut 20 acting as a lock-nut and therefore as a washer contacts the face of the packing gland 22.

In the second embodiment, shown in the right-hand cylinder arrangement the same reference numerals are used to designate similar parts. An annular distance piece or spacer 24 (which is conveniently and as shown provided in two pieces to facilitate replacement) is provided and serves as an abutment. Using this second embodiment the nuts 19 and 20 may be kept in fixed relationship to the extension 17, being mainly used in the initial setting up adjustment during erection of the press or for subsequent corrections, and the distance between the platens 10 and 11 at the final pressing position selected by using distance pieces or spacers 24 of the required thickness.

It will be appreciated that in both the above described first and second embodiment of the invention, the stops and abutments are located externally of the pressing space 25 between the head 8 and the table 9.

In the third embodiment (see FIGS. 3 and 4), means for controlling the distance between the head and table at the final pressing position comprises an inverted steel L-section bracket 26 welded to the upper surface of the head 27 adjacent each ram or piston 28, and transversely of the head of the press, one such bracket being provided on opposite sides of each cylinder with the foot 29 of the L in section extending longitudinally of the head and the feet of the brackets on opposite sides of a cylinder facing each other. The means also comprises an abutment consisting of a steel L-section bracket 30 welded to a structural element 31 of the press, a separate abutment being provided for each stop to provide a second set of brackets so arranged that, as the head 27 moves under the action of hydraulic fluid in the usual way, the uprights 32, 33 of each pair of first and second brackets 26 and 30 move in parallel spaced relationship to each other with the feet thereof moving in the same plane as each other.

A series of spacer members 34 in the form of metal strips accurately machined so that their thickness is known, is provided, a metal strip being adapted to be inserted between the facing surfaces of each pair of feet 29, 35, the arrangement being such that movement of the head 27 downwardly towards the table under the influence of the hydraulic fluid is prevented when each pair of stops and abutments trap between them the spacer member 34.

It will be apparent that, whilst metal strips are employed in this embodiment, they are not subjected to the same disadvantages as those described hereinbefore in connection with known presses in that for example they are not in contact with or closely adjacent to the material being pressed and therefore fibres from the latter do not tend to be trapped between the metal strips and the pressing surfaces. It is, in addition, practical, because of the limited area involved, to harden the contact areas of the brackets for better wear, which would not be possible in the case of having to harden large press platens. Since the reaction is taken up adjacent the cylinders, the hereinbefore described tedency of the head to bend is reduced.

It will be appreciated that in the above described third embodiment there are two stops or inverted L-shaped brackets between each cylinder in the longitudinal direction of the head. If desired, the brackets could be rigidly connected together, for example by one or more webs to increase their rigidity, whilst the end bracket or brackets could be provided with an appropriate stiffener or reinforcement.

In the fourth embodiment (see FIGS. 5 and 6), the means for controlling the distance between the head and the table comprise a series of vertical steel rods 36 provided one on each side of each ram or piston 37 in the tranverse direction of the head 38 the lower end of each rod being rigidly secured, for example welded, to the upper surface of the head. Desirably, however, the rods 36 are releasably engaged with the head 38 so that they may be removed when it is desired to dismantle the press and, conveniently for that purpose, the lower end portion of each rod may be screw-threaded to engage with an internally threaded bore in that portion of the head which is stress provided or designed for such purpose.

That end portion 39 of each rod remote from the head 38 is screw-threaded and is provided with two nuts 40, 41, the lower nut 41 being a lock-nut, the position of which on the screw-threaded end portion 39 of the rod is accurately adjustable and which may be locked to the rod in the adjusted position. Each steel rod 36 is adapted, as the head 38 is lowered and raised, to pass through the central aperture of a horizontally arranged bridge piece or plate 42 providing an abutment, the ends of each bridge piece or plate being supported by the upper edge surfaces of a pair of spaced parallel plate-like structural elements 43 arranged transversely of the head 38 and rigidly secured to the vertical members of the frame of the press, each pair of structural elements serving to support the bridge pieces or plates through which the rods 36 pass. If desired, pairs of adjacent rods between the rams or pistons may in effect be coalesced to give a single rod of larger cross-section than in the case of a single rod so as to give the strength required.

In operation, the position of the nuts 40, 41 on the upper end portions 39 of their rods 36 are adjusted to provide a selected distance between the head and table at the final pressing position and, as the head 38 moves downwardly under the action of the hydraulic fluid, the downward movement is prevented when the lower surface of each nut 41 contacts the upper surface of its bridge piece or plate 42.

Whilst the said adjustment of the nuts may be effected by a micrometer arrangement, conveniently the adjustment is made by inserting in the daylight of the press, that is between the head and the table, a specimen board, panel or the like of the thickness which is required in the board or panel to be formed, operating the press until the specimen board or panel is trapped between the head and table and then screwing the nuts 40, 41 down on the upper end parts 39 of their rods 36 until they contact the bridge pieces or plates 42. Thereafter the head is raised, the specimen board or panel is removed and the press is ready for operation or produce boards or panels of the selected thickness.

It will be appreciated that the lower nuts 20 and 41 of the FIGS. 2, 3 and 4 embodiments serve only to lock the nuts 19 and 40 respectively in position after adjustment, and that the lower nuts may be dispensed with if other means of locking are available.

In the fifth embodiment of the invention (see FIG. 7), the lower end 44 of a ram or piston 45 bears against a spacer member as will become apparent. A stop is provided by the enlarged upper end 46 of the ram or piston 45, such enlarged end being greater than the cross-sectional area of bore 47 and member 48 forming an abutment so that the enlarged upper end bears against the member 48 at the final pressing position. Spacer members 49 of differing thickness are provided for selective insertion between the head 50 and the lower end 44 of the ram or piston depending upon the thickness required of the panel or the like being formed, each insert being adapted to be releasably secured between the lower end 44 and the base 51 of the recess.

It will be appreciated that, in order to insert the enlarged upper end 46 of the ram or piston 45 within its cylinder, it will normally be essential to have a horizontal division in the latter, the two parts 52 and 53 of the cylinder being adapted to the fluid-tightly clamped together as indicated at 54.

Moreover, in such an arrangement—as in most downstroking presses—there will normally be retracting cylinders to draw the head away from the table when desired. In such a case, it would not be essential for the lower end 44 of the ram or piston 45, the spacer member 48 and the table to be secured together.

The embodiments described in relation to FIGS. 3 to 7 of the accompanying drawings are conveniently formed by adapting existing presses to incorporate the means of the present invention.

Whilst the invention has been described in connection with down-stroking presses, that is presses in which the head moves down towards a stationary table and is moved away therefrom by retracting cylinders, the invention is equally applicable to other presses, for example upstroking presses or down—and upstroking presses.

The invention may be used to advantage where heating by electric high frequency method is employed.

The invention is most advantageously employed in connection with single opening presses but may also be used to advantage in multiple opening presses in which case spacer members or distance pieces as described in connection with previously known presses will normally be used in relation to each opening in addition to the opening the size of which is controlled by the means of the present invention.

I claim:

1. A press comprising: at least one ram, a cylinder for each ram to work in, means for introducing pressurized fluid into said cylinder, a head and a table providing a pressing space between them and adapted to move relatively towards each other under the action of the pressurized fluid, means located externally of the pressing space for controlling the distance between said head and table, comprising: a stop associated with said head for following the movement thereof, an abutment for co-operating with said stop to prevent the head and table from moving towards each other, and means for adjusting the position at which said stop and abutment co-operate so as to select the final distance between the head and table when the pressing step takes place, the upper end of the ram extending axially beyond its cylinder and being provided with a nut screw-threadedly adjustable on the extension and providing said stop, the abutment being formed by the top of the cylinder.

2. The press of claim 1, in which spacer members of differing thickness are provided for selective location at the top of the cylinder.

3. In a press for pressing a workpiece to a predetermined thickness, the combination of a head and a table movable relatively towards each other and adapted to receive a workpiece therebetween, a fluid operator for effecting the relative movement of said head and table, said fluid operator including a cylinder and a ram slidable in said cylinder by pressurised fluid, an axial extension provided on said ram and projecting outwardly beyond the adjacent end of said cylinder, and a stop provided on said extension, said stop being abuttingly engagable with said adjacent end of the cylinder whereby to limit the extent of relative movement of the head and table and result in pressing the workpiece to a predetermined thickness.

4. The press as defined in claim 3 wherein said stop is axially adjustable on said extension of the ram.

5. The press as defined in claim 4 wherein said ram extension is screw-threaded and said stop comprises a nut screw-threadedly adjustable on said ram extension.

6. The press as defined in claim 3 together with an annular spacer of a selected axial thickness removably positioned on said adjacent end of said cylinder for abutment by said stop.

7. The press as defined in claim 6 wherein said annular spacer is characterized in that it is transversely split into a plurality of individual sections which may be laterally applied to and removed from their position around the ram extension at said adjacent end of the cylinder.

References Cited

UNITED STATES PATENTS

| | | | |
|---|---|---|---|
| 3,239,404 | 3/1966 | Gross | 100—257 XR |
| 3,373,596 | 3/1968 | Moeller et al. | 100—257 XR |
| 1,235,610 | 8/1917 | Staub | 100—269 XR |
| 2,980,013 | 4/1961 | Swick et al. | 100—257 |
| 3,094,889 | 6/1963 | Elsas | 83—529 |
| 3,154,006 | 10/1964 | Novak | 100—35 |

FOREIGN PATENTS 204,205  5/1966  Sweden.

BILLY J. WILHITE, Primary Examiner

U.S. Cl. X.R.

100—269; 18—16